W. H. SEARS.
Bed-Bottoms.
No. 143,190.          Patented September 23, 1873.
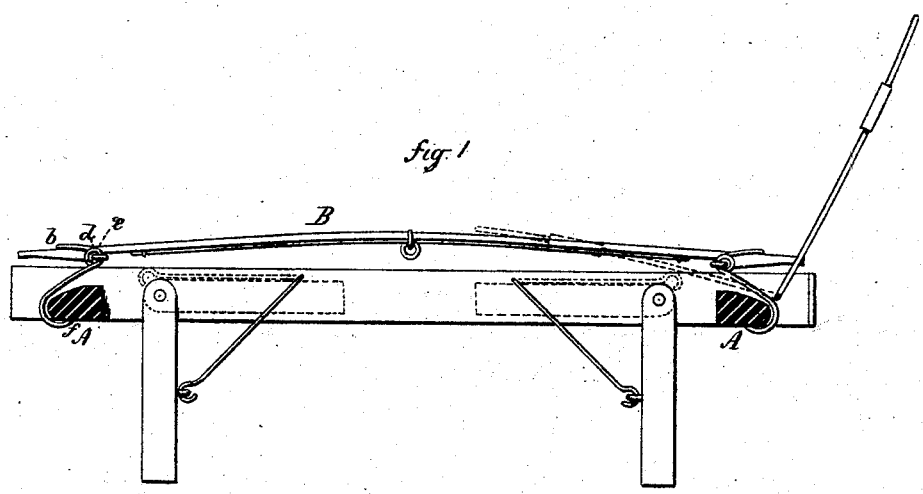
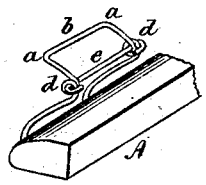
Witnesses.
J. H. Shumway
A. J. Tibbits
William H. Sears
Inventor
By Atty.
John E. Earl

UNITED STATES PATENT OFFICE.

WILLIAM H. SEARS, OF CHESHIRE, CONNECTICUT, ASSIGNOR TO TITUS STOWE, OF READSBOROUGH, VERMONT.

IMPROVEMENT IN BED-BOTTOMS.

Specification forming part of Letters Patent No. 143,190, dated September 23, 1873; application filed August 16, 1873.

*To all whom it may concern:*

Be it known that I, WILLIAM H. SEARS, of Cheshire, in the county of New Haven and State of Connecticut, have invented a new Improvement in Bed-Bottoms; and I do hereby declare the following, when taken in connection with the accompanying drawings and the letters of reference marked thereon, to be a full, clear, and exact description of the same, and which said drawings constitute part of this specification, and represent, in—

Figure 1, a longitudinal section, and in Fig. 2 a detached view, of one of the springs.

This invention relates to an improvement in spring bed-bottoms, such as are formed from wood slats, with an independent spring at one or both ends for each slat; and it consists in the peculiar form of the spring, as more fully hereinafter described.

A is a transverse bar, one arranged at each end, and held rigidly by a suitable frame. To this bar the several springs are secured. These springs are formed from wire of suitable size, bent equidistant from each end, as at $a$ $a$, so as to form a bar, $b$, at the top. At a short distance from these angles, as at $d$, the wire is coiled to form an eye, through which a bar, $e$, is passed, the two ends then curved back and around the bar A, and firmly secured thereto, as seen in Fig. 1. That portion of the wire or legs between the securing-point $f$ and the eyes forms the spring, and one of these springs is fitted for one or both ends of each slat.

The end of the slat B is passed over the bar $e$ and beneath the bar $b$, as seen in Fig. 1.

Preferably a like spring is arranged at both ends, as shown in Fig. 1.

I claim as my invention—

The spring for bed-bottoms herein described, consisting of the two legs secured to the bar A, bent to form the bar $b$, and combined with the bar $e$, the end of the slat passing between and supported by the said bars $b$ $e$, substantially as set forth.

WM. H. SEARS.

Witnesses:
A. J. TIBBITS,
J. H. SHUMWAY.